(12) United States Patent
Pan

(10) Patent No.: US 11,461,773 B2
(45) Date of Patent: Oct. 4, 2022

(54) BLOCKCHAIN-BASED NODE MANAGEMENT METHODS AND APPARATUSES

(71) Applicant: Advanced New Technologies Co., Ltd., Grand Cayman (KY)

(72) Inventor: Dong Pan, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/162,850

(22) Filed: Jan. 29, 2021

(65) Prior Publication Data

US 2021/0158347 A1 May 27, 2021

Related U.S. Application Data

(63) Continuation of application No. PCT/CN2019/104965, filed on Sep. 9, 2019.

(30) Foreign Application Priority Data

Oct. 31, 2018 (CN) .................. 201811283607.X

(51) Int. Cl.
*G06Q 20/38* (2012.01)
*G06Q 20/40* (2012.01)
(Continued)

(52) U.S. Cl.
CPC ..... *G06Q 20/38215* (2013.01); *G06Q 20/389* (2013.01); *G06Q 20/405* (2013.01);
(Continued)

(58) Field of Classification Search
CPC .......... G06Q 20/38215; G06Q 20/389; G06Q 20/405; G06Q 20/401; G06Q 10/0833;
(Continued)

(56) References Cited

U.S. PATENT DOCUMENTS 9,960,923 B2 * 5/2018 Zombik ................ H04L 9/3268
10,095,888 B1 * 10/2018 Lee .......................... G06F 21/64
(Continued)

FOREIGN PATENT DOCUMENTS

CN  105701372  6/2016
CN  105976231  9/2016
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Slade E Smith
(74) *Attorney, Agent, or Firm* — Fish & Richardson P.C.

(57) ABSTRACT

Systems and methods for blockchain-based node management. In an aspect, a system receives, by an existing node of a blockchain, a target transaction, wherein the target transaction comprises a certificate of a new node and a unique identifier of the new node; verifies the target transaction by the target transaction passing consensus verification of the blockchain; and after the target transaction passes consensus verification of the blockchain to verify the blockchain, records, in a node identity table that is used to record a certificate of a blockchain node and a unique identifier that is of the blockchain node and that corresponds to the certificate, the unique identifier and the certificate of the new node.

13 Claims, 2 Drawing Sheets

(51) Int. Cl.
  *H04L 9/32* (2006.01)
  *H04L 9/00* (2022.01)
(52) U.S. Cl.
  CPC ............ *H04L 9/3213* (2013.01); *H04L 9/50* (2022.05); *H04L 2209/56* (2013.01)
(58) Field of Classification Search
  CPC .. G06Q 10/10; G06Q 20/0658; G06Q 20/382; G06Q 20/3829; G06Q 2220/00; G06Q 30/0185; G06Q 50/18; H04L 9/3213; H04L 2209/38; H04L 2209/56; H04L 9/0637; H04L 9/3268; H04L 9/008; H04L 9/30; G06F 16/2379; G06F 21/6227
  USPC .......................................................... 705/64
  See application file for complete search history.

(56) References Cited

U.S. PATENT DOCUMENTS

| | | | |
|---|---|---|---|
| 10,509,919 B1* | 12/2019 | Wang | G06Q 20/401 |
| 10,554,414 B1* | 2/2020 | Winarski | H04L 9/3236 |
| 2004/0010665 A1* | 1/2004 | Agarwal | G06Q 10/10 |
| | | | 711/156 |
| 2009/0249062 A1* | 10/2009 | Thomas | H04W 12/069 |
| | | | 713/158 |
| 2011/0238986 A1* | 9/2011 | Kherani | H04L 63/0823 |
| | | | 713/168 |
| 2011/0238987 A1* | 9/2011 | Kherani | H04L 67/12 |
| | | | 713/168 |
| 2016/0098723 A1 | 4/2016 | Feeney et al. | |
| 2016/0142213 A1* | 5/2016 | Deniaud | H04L 61/2503 |
| | | | 713/175 |
| 2017/0331896 A1* | 11/2017 | Holloway | H04L 67/104 |
| 2017/0346833 A1* | 11/2017 | Zhang | H04L 9/3247 |
| 2017/0352012 A1* | 12/2017 | Hearn | G06Q 20/3829 |
| 2018/0115413 A1* | 4/2018 | King | H04L 9/30 |
| 2018/0137512 A1* | 5/2018 | Georgiadis | H04L 63/08 |
| 2018/0159845 A1* | 6/2018 | Aronov | H04L 63/0435 |
| 2018/0227275 A1* | 8/2018 | Russinovich | H04L 63/101 |
| 2018/0262351 A1* | 9/2018 | Liu | H04L 67/34 |
| 2018/0349621 A1* | 12/2018 | Schvey | G09C 1/00 |
| 2018/0359089 A1* | 12/2018 | Innes | G06F 16/25 |
| 2019/0019183 A1* | 1/2019 | Karame | H04L 9/008 |
| 2019/0020729 A1* | 1/2019 | Chen | G06Q 20/02 |
| 2019/0036712 A1* | 1/2019 | Qiu | H04L 9/3268 |
| 2019/0130398 A1* | 5/2019 | Brown | H04L 9/3239 |
| 2019/0130483 A1* | 5/2019 | de Jong | G06Q 20/40 |
| 2019/0228665 A1* | 7/2019 | Bosworth | H04L 9/0637 |
| 2019/0251573 A1* | 8/2019 | Toyota | H04L 9/3236 |
| 2019/0295049 A1* | 9/2019 | Karame | G06Q 20/0658 |
| 2019/0295050 A1* | 9/2019 | Chalkias | G06Q 20/40 |
| 2019/0295336 A1* | 9/2019 | Jones | H04L 67/1042 |
| 2019/0319798 A1* | 10/2019 | Chalkias | H04L 9/3236 |
| 2019/0319928 A1* | 10/2019 | Nesbit | H04L 63/0281 |
| 2019/0342077 A1* | 11/2019 | McMurdie | H04L 9/3239 |
| 2019/0354977 A1* | 11/2019 | Tang | G06Q 20/3829 |
| 2019/0370486 A1* | 12/2019 | Wang | G06Q 20/389 |
| 2019/0370806 A1* | 12/2019 | Wang | G06Q 20/382 |
| 2019/0372985 A1* | 12/2019 | Zamora Duran | H04L 9/50 |
| 2019/0378134 A1* | 12/2019 | Asari | H04L 9/3239 |
| 2019/0384748 A1* | 12/2019 | Roennow | G06F 21/64 |
| 2020/0013053 A1* | 1/2020 | Amin | H04L 63/10 |
| 2020/0021443 A1* | 1/2020 | Falk | G06F 21/64 |
| 2020/0021446 A1* | 1/2020 | Roennow | H04L 63/1458 |
| 2020/0057417 A1* | 2/2020 | Ping | G05B 13/042 |
| 2020/0067708 A1* | 2/2020 | Subba | H04L 9/0861 |
| 2020/0073758 A1* | 3/2020 | Natarajan | H04L 9/3239 |
| 2020/0073962 A1* | 3/2020 | Natarajan | H04L 9/0643 |
| 2020/0076571 A1* | 3/2020 | Natarajan | G06F 16/2246 |
| 2020/0076595 A1* | 3/2020 | Hathorn | H04L 9/3263 |
| 2020/0082361 A1* | 3/2020 | Chan | H04L 9/3247 |
| 2020/0084041 A1* | 3/2020 | Xu | H04L 63/123 |
| 2020/0090140 A1* | 3/2020 | Seol | G07C 13/00 |
| 2020/0117585 A1* | 4/2020 | Falk | G06Q 20/382 |
| 2020/0134206 A1* | 4/2020 | Thekadath | G06F 16/27 |
| 2020/0162448 A1* | 5/2020 | Dasika Venkata Devi | |
| | | | H04L 67/306 |
| 2020/0162550 A1* | 5/2020 | Destefanis | H04L 67/1097 |
| 2020/0193764 A1* | 6/2020 | Ovalle | G06Q 20/405 |
| 2020/0201683 A1* | 6/2020 | Muskal | H04L 9/3247 |
| 2020/0202312 A1* | 6/2020 | Destefanis | G06Q 20/085 |
| 2020/0235947 A1* | 7/2020 | Baykaner | H04L 9/0816 |
| 2020/0242604 A1* | 7/2020 | Falk | G06Q 20/401 |
| 2020/0244472 A1* | 7/2020 | Dinkelaker | G06Q 20/102 |
| 2020/0266989 A1* | 8/2020 | Krcmaricic-Barackov | |
| | | | H04L 9/3213 |
| 2020/0293361 A1* | 9/2020 | Falk | G06F 9/466 |
| 2020/0351116 A1* | 11/2020 | Jetzfellner | H04L 12/2816 |
| 2020/0372158 A1* | 11/2020 | Wang | G06F 8/65 |
| 2020/0374135 A1* | 11/2020 | Lu | H04L 9/3263 |
| 2020/0382326 A1* | 12/2020 | Guo | H04L 9/3265 |
| 2020/0387503 A1* | 12/2020 | Zhang | G06Q 10/10 |
| 2020/0387622 A1* | 12/2020 | Falk | G06F 7/08 |
| 2020/0389321 A1* | 12/2020 | Fletcher | H04L 9/0637 |
| 2020/0396089 A1* | 12/2020 | Guo | H04L 9/3239 |
| 2021/0021419 A1* | 1/2021 | Guo | H04L 9/0894 |
| 2021/0021424 A1* | 1/2021 | Punal | H04L 9/3236 |
| 2021/0027289 A1* | 1/2021 | Guo | H04L 9/50 |
| 2021/0037100 A1* | 2/2021 | Jetzfellner | G06F 16/9024 |
| 2021/0055718 A1* | 2/2021 | Rathgeb | H04L 9/3239 |

FOREIGN PATENT DOCUMENTS

| | | |
|---|---|---|
| CN | 106411901 | 2/2017 |
| CN | 107171829 | 9/2017 |
| CN | 107360001 | 11/2017 |
| CN | 107426157 | 12/2017 |
| CN | 107508680 | 12/2017 |
| CN | 107547514 | 1/2018 |
| CN | 108256864 | 7/2018 |
| CN | 108615144 | 10/2018 |
| CN | 108667618 | 10/2018 |
| CN | 109327528 | 2/2019 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2019/104965, dated Nov. 28, 2019, 9 pages (with partial English translation).
PCT International Preliminary Report on Patentability in International Application No. PCT/CN2019/104965, dated Apr. 27, 2021, 10 pages (with English translation).
Extended European Search Report in European Application No. 19880324.9, dated May 3, 2021, 12 pages.
Yoshihama et al., "Study on Integrity and Privacy Requirements of Distributed Ledger Technologies," 2018 IEEE International Conference on Internet of Things (Ithings) and IEEE Green Computing and Communications (Greencom) and IEEE Cyber, Physical and Social Computing (CPSCOM) and IEEE Smart Data (Smartdata), IEEE, Jul. 2018, pp. 1657-1664.

* cited by examiner

BLOCKCHAIN-BASED NODE MANAGEMENT METHODS AND APPARATUSES

CROSS-REFERENCE TO RELATED APPLICATIONS

This application is a continuation of PCT Application No. PCT/CN2019/104965, filed on Sep. 9, 2019, which claims priority to Chinese Patent Application No. 201811283607.X, filed on Oct. 31, 2018, and each application is hereby incorporated by reference in its entirety.

TECHNICAL FIELD

The present specification relates to the field of network technologies, and in particular, to blockchain-based node management methods and apparatuses.

BACKGROUND

A blockchain technology, also known as a distributed ledger technology, is a new technology that several computing devices participate in "bookkeeping" and jointly maintain a complete distributed database. The blockchain technology features decentralization and transparency. In addition, each computing device can participate in database recording, and data synchronization between the computing devices can be fast implemented. Therefore, the blockchain technology has been widely used in many fields.

SUMMARY

The present specification provides a blockchain-based node management method. A node identity table is stored in a distributed database of a blockchain, and is used to record a certificate of a blockchain node and a unique identifier that is of the blockchain node and that corresponds to the certificate. The method includes the following: an existing node of the blockchain receives a target transaction, where the target transaction includes a certificate of a new node and a unique identifier of the new node; the target transaction is verified, so that after the target transaction passes consensus verification of the blockchain, a node identity table including the unique identifier and the certificate of the new node is correspondingly recorded to the distributed database of the blockchain.

In some embodiments, the verification on the target transaction includes the following: verification on the certificate of the new node, and verification on whether a node identity certification authority corresponding to the certificate of the new node is a node identity certification authority approved by the blockchain.

In some embodiments, the target transaction further includes digital signatures created by endorsement nodes of the blockchain based on at least the certificate of the new node; the verification on the target transaction includes the following: verification on whether valid digital signatures created by the endorsement nodes of the blockchain based on at least the certificate of the new node meet a predetermined quantity.

In some embodiments, the method further includes the following: a smart contract corresponding to management of the node identity table is invoked, update logic of the node identity table stated in the smart contract is executed, the target transaction is verified, and after the verification is passed, the unique identifier and the certificate of the new node are correspondingly recorded to the node identity table.

In some embodiments, the method further includes the following: a network address of the new node, the unique identifier of the new node, and a digital signature created by the new node are received; the node identity table is obtained from the distributed database of the blockchain, and the certificate of the new node is obtained based on the unique identifier; the digital signature is verified based on the certificate of the new node; the network address is stored in a local database of the existing node of the blockchain after the verification is passed.

In some embodiments, the method further includes the following: network addresses of other existing nodes of the blockchain stored in a local database of the blockchain node are sent to the new node.

In some embodiments, the method further includes the following: data in the distributed database of the blockchain backed up by the existing node of the blockchain is sent to the new node.

Correspondingly, the present specification further provides a blockchain-based node management apparatus. A node identity table is stored in a distributed database of a blockchain, and is used to record a certificate of a blockchain node and a unique identifier that is of the blockchain node and that corresponds to the certificate. The apparatus includes the following: a receiving unit, configured to receive, for an existing node of the blockchain, a target transaction, where the target transaction includes a certificate of a new node and a unique identifier of the new node; a verifying unit, configured to verify the target transaction, so that after the target transaction passes consensus verification of the blockchain, a node identity table including the unique identifier and the certificate of the new node is correspondingly recorded to the distributed database of the blockchain.

In some embodiments, the verifying unit is configured to verify the certificate of the new node, and verify whether a node identity certification authority corresponding to the certificate of the new node is a node identity certification authority approved by the blockchain.

In some embodiments, the target transaction further includes digital signatures created by endorsement nodes of the blockchain based on at least the certificate of the new node; the verifying unit is configured to verify whether valid digital signatures created by the endorsement nodes of the blockchain based on at least the certificate of the new node meet a predetermined quantity.

In some embodiments, the apparatus further includes the following: a smart contract execution unit, configured to invoke a smart contract corresponding to management of the node identity table, execute update logic of the node identity table stated in the smart contract, verify the target transaction, and after the verification is passed, correspondingly record the unique identifier and the certificate of the new node to the node identity table.

In some embodiments, the apparatus further includes an obtaining unit and a storage unit, where the receiving unit is configured to receive a network address of the new node, the unique identifier of the new node, and a digital signature created by the new node; the obtaining unit is configured to obtain the node identity table from the distributed database of the blockchain, and obtain the certificate of the new node based on the unique identifier; the verifying unit is configured to verify the digital signature based on the certificate of the new node; the storage unit is configured to store the network address in a local database of the existing node of the blockchain after the verification is passed.

In some embodiments, the apparatus further includes the following: a sending unit, configured to send network addresses of other existing nodes of the blockchain stored in a local database of the blockchain node to the new node.

In some embodiments, the apparatus further includes the following: a sending unit, configured to send data in the distributed database of the blockchain backed up by the existing node of the blockchain to the new node.

The present specification further provides a computer device, including a memory and a processor. The memory stores a computer program that can be executed by the processor, and the processor executes the computer program to perform steps of the previously described blockchain-based node management method.

The present specification further provides a computer readable storage medium, storing a computer program. When the computer program is executed by a processor, steps of the previously described blockchain-based node management method are performed.

According to the blockchain-based node management methods and apparatuses provided in the present specification, the node identity table is created and stored in the distributed database of the blockchain, and certificates of nodes that can join the blockchain are recorded to the node identity table, to prevent any node from joining the blockchain without the consensus or consent of the nodes in the blockchain, thereby ensuring security of the blockchain.

DESCRIPTION OF EMBODIMENTS

Example embodiments are described in detail here, and examples of the example embodiments are presented in the accompanying drawings. When the following description relates to the accompanying drawings, unless specified otherwise, same numbers in different accompanying drawings represent same or similar elements. Implementations described in the following example embodiments do not represent all implementations consistent with the present specification. On the contrary, the implementations are only examples of apparatuses and methods that are described in the appended claims in detail and consistent with some aspects of the present specification.

It is worthwhile to note that, steps of corresponding methods in other embodiments are not necessarily performed in the order shown and described in the present specification. Methods in some other embodiments can include more or less steps than those described in the present specification. In addition, a single step described in the present specification may be divided into a plurality of steps for description in other embodiments, and a plurality of steps described in the present specification may also be combined into a single step for description in other embodiments.

Figure 1:
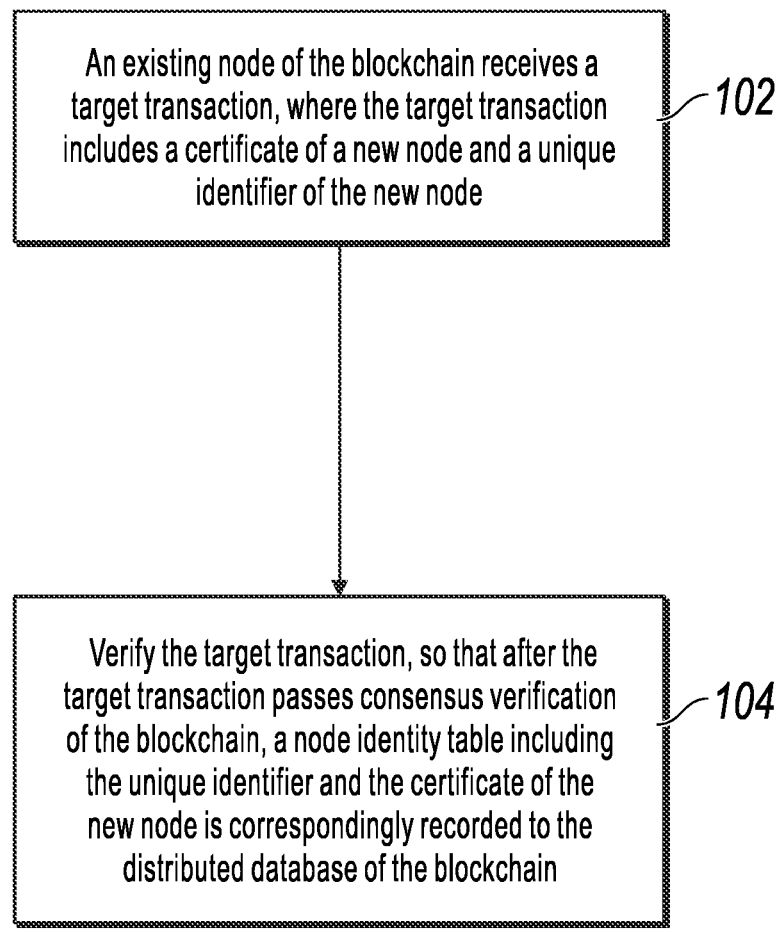
FIG. 1 is a flowchart illustrating a blockchain-based node management method, according to some example embodiments of the present specification.

As shown in FIG. 1, some example embodiments of the present specification provide a blockchain-based node management method. A trusted node table used to record an identity certificate of a trusted node is stored in a distributed database of a blockchain. The node identity table is used to record a certificate of a blockchain node and a unique identifier that is of the blockchain node and that corresponds to the certificate.

A blockchain in some embodiments can be a peer to peer (P2P) network system that is formed by node devices by using a consensus algorithm and that has a distributed data storage structure. Data in the blockchain is distributed on "blocks" that are connected to each other in terms of time. A latter block includes a data digest of a previous block. In addition, full data backup of all or some of the node devices is achieved based on different consensus algorithms (for example, Proof of Work (PoW), Proof of Stake (PoS), Delegated Proof of Stake (DPoS), and Practical Byzantine Fault Tolerance (PBFT)). A person skilled in the art intimately knows that because the blockchain system operates under a corresponding consensus algorithm, it is difficult for any node device to tamper with data that has been recorded to the blockchain database. For example, an attack of tampering with the existing data on a blockchain based on PoW consensus needs at least 51% computing power of the whole network. Therefore, the blockchain system has the feature of ensuring data security and preventing attacks and tampering, which is incomparable to other centralized database systems.

The blockchain node in the present specification can not only include a full node device that backs up full data of the distributed database of the blockchain, but also include a light node device that backs up a part of the data of the distributed database of the blockchain, and other terminal devices or client devices. The blockchain node is not limited in the present specification.

The transaction in the present specification refers to data that is created by a user by using a node device of the blockchain and that needs to be finally deployed in the distributed database of the blockchain. There are a transaction in a narrow sense and a transaction in a broad sense in the blockchain. The transaction in a narrow sense refers to value transfer deployed by the user to the blockchain. For example, in a conventional bitcoin blockchain network, the transaction can be transfer initiated by the user in the blockchain. However, the transaction in a broad sense refers to arbitrary data deployed by the user to the blockchain. For example, an operator can establish a consortium blockchain based on actual service needs, and deploy some other types of online services (such as a house rental service, a vehicle scheduling service, an insurance claim service, a credit service, and a medical service) unrelated to value transfer depending on the consortium blockchain. In such a consortium blockchain, the transaction can be a service message or a service request that is deployed by the user to the consortium blockchain and that has a service intention. For another example, the transaction can also be data (such as an account balance) sent by the user to the blockchain to change the user account state. Therefore, arbitrary data deployed by the user to the distributed database of the blockchain belongs to the "transaction" in the present invention, regardless of whether the arbitrary data is stored in the block body, the block header, or other locations of the block.

In a conventional blockchain, identities of nodes are not recorded in a distributed database of the blockchain. After a user joins the blockchain by using a blockchain network registration protocol, a registered user identity (or account identity) is usually bound to a node device running the registration protocol, and the user identity bound to the node is displayed in a network routing table. For example, in an Ethereum blockchain, a user obtains a user account by running a network registration protocol on a node device, and information such as enode://pubkey1@ip1:port1 is added to a network routing table of the blockchain, to facilitate communication with other nodes in the blockchain. The routing information exposes a node IP address and port information of the user in the blockchain, causing security risks.

In some embodiments, to facilitate management of blockchain nodes, the node identity table is stored in the distributed database of the blockchain based on consensus of the blockchain nodes, and is used to record a certificate of a node in the blockchain network and a unique identifier that is of the blockchain node and that corresponds to the certificate. The certificate of the node can include a public key corresponding to the node and a digital signature created by a node identity certification authority for at least the public key of the node, and can further include an ID name, an organization, a physical address, and other identity information of the node. The type of a protocol that the certificate follows is not limited in the present specification. All certificates certified by the Certification Authority (CA), such as Transport Layer Security (TLS) certificates, can be applied to the embodiments provided in the present specification. The node identity certification authority can include a management organization of the blockchain system, or users with high credit in the blockchain, etc., and is not limited here. The unique identifier of the blockchain node can include a name of the node, identity code of the node, the public key of the node, etc. Based on the consensus of the nodes in the blockchain, the node identity table is used to manage the nodes in the blockchain, which increases the security of the blockchain system.

The blockchain-based node management method provided in some embodiments includes the following steps.

Step 102: The blockchain node receives a target transaction, where the target transaction includes a certificate of a new node and a unique identifier of the new node.

The new node that intends to join the blockchain can communicate with any identity management node with node identity table management permission in the blockchain by means of out-of-chain communication or by running a node joining protocol, and send the certificate and the unique identifier of the new node to the identity management node, so that the identity management node sends the target transaction used to update the node identity table to the blockchain, to propagate the target transaction in the blockchain. Therefore, the blockchain node can receive the target transaction.

The target transaction can include the certificate of the existing node of the blockchain and the unique identifier corresponding to the certificate, so that after blockchain consensus is achieved on the node identity table update transaction, the node identity table including the certificates of the existing node and the new node and the unique identifiers corresponding to the certificates is updated to the distributed database of the blockchain. Alternatively, the target transaction can include only the certificate of the new node and the unique identifier of the new node, so that after blockchain consensus is achieved on the node identity table update transaction, the certificate of the new node and the unique identifier of the new node are updated to a state of the node identity table that is set in the distributed database of the blockchain.

Step 104: Verify the target transaction, so that after the target transaction passes consensus verification of the blockchain, a node identity table including the unique identifier and the certificate of the new node is correspondingly recorded to the distributed database of the blockchain.

After receiving the target transaction, the existing node of the blockchain verifies the target transaction based on a verification rule of the blockchain on the target transaction, so that after the target transaction passes consensus verification of the blockchain, the node identity table including the unique identifier and the certificate of the new node is correspondingly recorded to the distributed database of the blockchain.

The verification performed by the existing node of the blockchain on the target transaction in some embodiments usually includes verification on content of the target transaction, for example, verifying whether the certificate of the new node is valid by using a public key of a node identity certification authority, and verifying whether a node identity certification authority that signs the certificate of the new node is a node identity certification authority approved by the blockchain.

To ensure the security, adding the new node to the blockchain usually requires endorsement of some existing nodes. The "endorsement" is usually represented by digital signatures created by these nodes based on at least the certificate of the new node. In the present specification, the nodes that "endorse" the new node are referred to as "endorsement nodes". Therefore, the verification can further include verification on the digital signatures that are created by the endorsement nodes of the blockchain based on at least the certificate of the new node and that are included in the target transaction, and calculating whether the digital signatures verified to be valid meet a predetermined quantity. That is, the node identity table update transaction can pass the verification only if the endorsement nodes that endorse the joining of the new node meet the predetermined quantity.

A person skilled in the art should know that, specific steps of recording the target transaction to the distributed database of the blockchain can include the following: nodes with ledger permission in the blockchain record the target transaction to a candidate block, where the target transaction is recorded to a location including but not limited to a block body or a block header; a consensus ledger node meeting a consensus algorithm of the blockchain is determined from the nodes with ledger permission; the consensus ledger node broadcasts the candidate block to the nodes of the blockchain; after the candidate block is verified and approved by the predetermined quantity of nodes of the blockchain, the candidate block is regarded as the latest block and added to the distributed database of the blockchain.

In the previously described embodiments, the node with ledger permission is a node with permission to generate a candidate block, and can include a node of a user with high credit or other nodes in the blockchain. Based on the consensus algorithm of the blockchain, the consensus ledger node can be determined from the nodes with ledger permission for the candidate block. The consensus algorithm can include PoW, PoS, DPoS, PBFT that is usually used in a consortium blockchain, etc.

In some embodiments, recording the certificate and the unique identifier of the new node to the node identity table can also be implemented by invoking a smart contract. The smart contract stores the node identity table that is used to manage the nodes in the blockchain network. The target transaction can include the certificate and the unique identifier of the new node, and an address and an interface of the smart contract invoked by the target transaction, so that after blockchain consensus is achieved on a running result of the smart contract invoked by the target transaction, the certificate and the unique identifier of the new node are updated to the node identity table stored in the smart contract.

Therefore, the blockchain-based node management method in the previously described embodiments further includes the following: invoking a smart contract corresponding to management of the node identity table, executing update logic of the node identity table stated in the smart contract, verifying the target transaction, and after the verification is passed, correspondingly recording the unique identifier and the certificate of the new node to the node identity table.

Similarly, in the update logic of the node identity table executed by the smart contract described in some embodiments, the verification on the target transaction usually includes the verification on the content of the target transaction, for example, verifying the certificate of the new node by using a public key of a node identity certification authority, and verifying whether the node identity certification authority is a node identity certification authority approved by the blockchain. The verification on the target transaction can further include the verification on the digital signatures created by the endorsement nodes of the blockchain based on at least the certificate of the new node, and calculating whether the digital signatures verified to be valid meet the predetermined quantity. That is, the node identity table update transaction can pass the validity verification of the smart contract only if the endorsement nodes that endorse the joining of the new node meet the predetermined quantity.

The smart contract is used to manage and update the node identity table of the blockchain. The smart contract can be invoked at any time in response to the target transaction sent by the node with node identity table management permission in the blockchain, to manage and update the node identity table based on the consensus of the nodes in the blockchain, thereby improving the security, legitimacy, and fairness of blockchain node management.

After steps 102 and 104 are performed, the new node that intends to join the blockchain obtains the permission to join the blockchain. After obtaining the permission to join the blockchain, the new node can obtain a network address of at least one existing node of the blockchain by means of out-of-chain communication or by using other methods, and establish communication connection with the at least one existing node by using the network address. The network address in some embodiments of the present specification can generally include an IP address and a port that the node is located on, and other content.

In some embodiments, the blockchain-based node management method provided in the present specification further includes steps 106 to 110.

Step 106: Receive a network address of the new node, the unique identifier of the new node, and a digital signature created by the new node.

Based on the out-of-chain communication connection with the new node, the new node can send the network address of the new node, the unique identifier (such as a name, a hardware address, identity code, or a public key) of the new node, and the digital signature created by the new node to the existing node that is of the blockchain and that generates the communication connection. Correspondingly, the existing node of the blockchain receives the network address of the new node, the unique identifier of the new node, and the digital signature created by the new node.

It is worthwhile to note that, the digital signature created by the new node is a digital signature created by the new node by using a private key corresponding to a public key in a certificate that has been recorded to the node identity table. The digital signature can be created based on any content, such as the network address of the new node, the unique identifier of the new node, or other content, to facilitate the existing node in communication connection with the new node in verifying the digital signature based on the certificate of the new node recorded to the node identity table, so as to determine whether the new node communicating with the existing node is indeed a new node approved based on blockchain consensus. It is worthwhile to note that, when the digital signature created by the new node is based on other content, the new node should send content signed by the new node to the existing node of the blockchain, to facilitate the existing node in verifying the digital signature.

Step 108: Obtain the node identity table from the distributed database of the blockchain, and obtain the certificate of the new node based on the unique identifier.

According to the node identity table update methods provided in the previously described embodiments, the existing node of the blockchain can retrieve, based on the unique identifier sent by the new node, the corresponding certificate of the new node from the target transaction recorded to the distributed database of the blockchain, or from the state of the node identity table, or by using a method such as invoking and running the smart contract that is used to store and manage the node identity table.

Step 110: Verify the digital signature based on the certificate of the new node.

The public key of the new node is obtained from the certificate of the new node, and is used to verify the digital signature created by the new node. If the verification is passed, it is proved that the new node in communication connection with the existing node of the blockchain is indeed a trusted node that passes the consensus verification of all nodes in the blockchain.

Step 112: Store the network address in a local database of the existing node after the verification is passed.

To facilitate the nodes in the blockchain in updating and synchronizing the data in the distributed database of the blockchain, each node in the blockchain needs to know a network address of at least one other blockchain node, to complete the transmission, broadcasting, or synchronization of the data. The node in the blockchain can store network addresses of other blockchain nodes in a local database. For example, IP addresses and ports of other blockchain nodes are recorded to a dedicated Config file configured in the local database. Therefore, when the existing node of the blockchain verifies that the certificate of the new node is recorded to the node identity table and determines that the new node is indeed a trusted node that obtains consent to joining based on the blockchain consensus, the existing node of the blockchain should store the network address of the new node in the local database, for example, record the network address of the new node to the dedicated Config file.

Based on the previously described steps, the new node can act as a blockchain node to synchronize block data with the existing node. That is, data in the distributed database of the blockchain backed up by the existing node is sent to the new node. In some embodiments, the block data synchronization can include the following steps:

The new node initiates a block data synchronization request to the existing node in the blockchain network. Existing block data is synchronized from the existing node, which is usually a neighboring node near the new node.

Further, to improve a download process of initial block data, a download method of "header first" can be used. Block headers of all existing blocks are first downloaded from neighboring nodes, and after the block headers are downloaded, the new node can simultaneously download blocks with different height intervals from a plurality of neighboring nodes, thereby greatly improving a synchronization speed of the existing block data. After the synchronization is completed, block data verification is performed. The block data verification process includes block format verification (including a version and a timestamp), block header hash value verification, verification on all transactions based on transaction verification rules, etc. The verification on all transactions based on the transaction verification rules includes verifying whether formats of the transactions are correct, verifying whether Merkle roots generated based on data structures of the transactions are correct, etc., to verify the correctness of the existing block data. After the block data verification is completed, the new node acts as a blockchain node to participate in the operation of the blockchain, receives, verifies, and stores a new block generated based on the consensus of the nodes in the blockchain, etc.

In the previously described embodiments, the new node can simultaneously download the blocks with different height intervals from the plurality of neighboring nodes, to improve data synchronization efficiency. In some embodiments, the existing node in the previously described embodiments can send network addresses of other existing nodes stored in the local database of the existing node to the new node, to facilitate the new node in establishing communication connection. Similarly, after performing steps described in steps 102 to 112 in the previously described embodiments, the other existing nodes approve that the new node is a trusted node of the blockchain, and therefore perform data synchronization with the new node by sending data in the distributed database of the blockchain backed up by the existing nodes to the new node.

According to the blockchain-based node management methods provided in the previously described embodiments, the node identity table is created and stored in the distributed database of the blockchain, and certificates of nodes that can join the blockchain are recorded to the node identity table, to prevent any node from joining the blockchain without the consensus or consent of the nodes in the blockchain, thereby ensuring security of the blockchain. By means of out-of-chain communication with the new node, the existing node of the blockchain verifies whether the new node is a trusted node that obtains consent to being received based on the consensus of the nodes in the blockchain, and after the verification is passed, treats the new node as a node in the blockchain and records the network address of the new node in the blockchain to the local database, to facilitate communication and data transmission or broadcasting within the blockchain network between the existing node and the new node.

Figure 3:
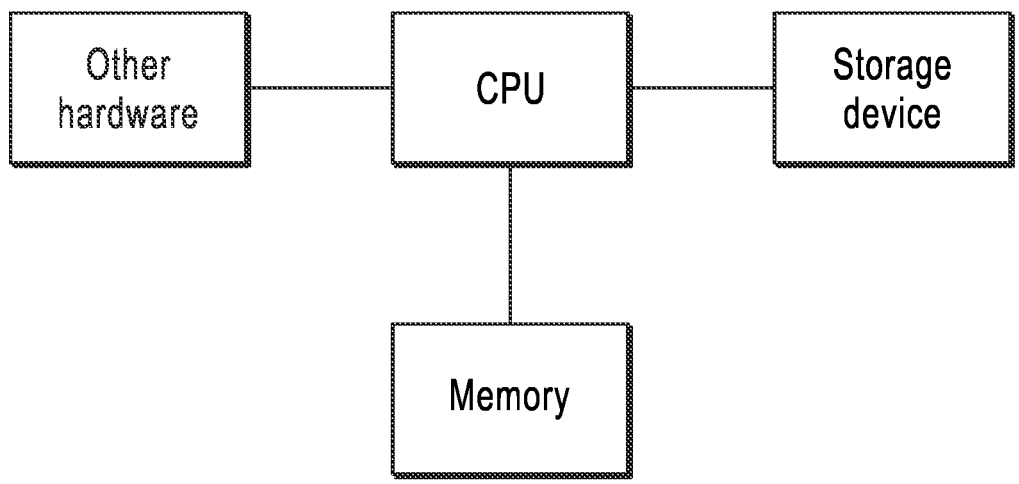
FIG. 3 is a diagram illustrating a hardware structure used to perform blockchain-based node management apparatus embodiments provided in the present specification.

Corresponding to the previous procedure implementation, embodiments of the present specification further provide a blockchain-based node management apparatus. The apparatus can be implemented by using software, or can be implemented by using hardware, or can be implemented by using a combination of hardware and software. Software implementation is used as an example. As a logic apparatus, the software is formed by reading a corresponding computer program instruction into a memory using a central processing unit (CPU) in a device that the software is located on. In terms of hardware, in addition to a CPU, a memory, and a storage device shown in FIG. 3, the device that the blockchain-based node management apparatus is located on usually further includes other hardware such as a chip for sending and receiving radio signals, and/or other hardware such as a card for implementing a network communication function.

Figure 2:
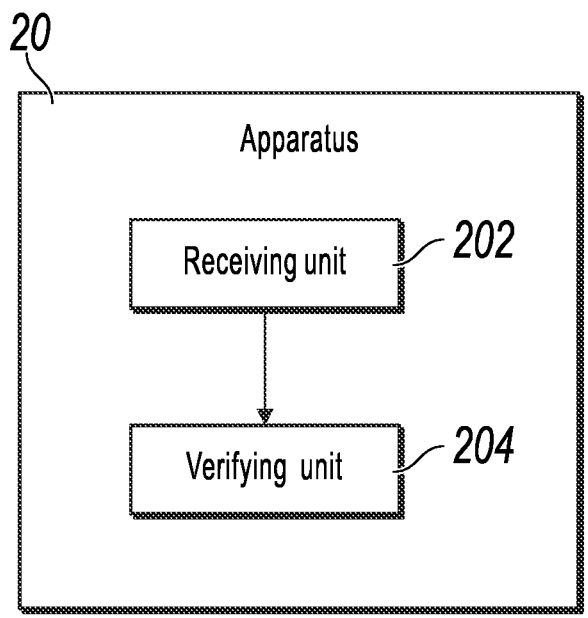
FIG. 2 is a schematic diagram illustrating a blockchain-based node management apparatus, according to some example embodiments of the present specification.

FIG. 2 illustrates a blockchain-based node management apparatus 20. A node identity table is stored in a distributed database of a blockchain, and is used to record a certificate of a blockchain node and a unique identifier that is of the blockchain node and that corresponds to the certificate. The apparatus 20 includes the following: a receiving unit 202, configured to receive, for an existing node of the blockchain, a target transaction, where the target transaction includes a certificate of a new node and a unique identifier of the new node; a verifying unit 204, configured to verify the target transaction, so that after the target transaction passes consensus verification of the blockchain, a node identity table including the unique identifier and the certificate of the new node is correspondingly recorded to the distributed database of the blockchain.

In some embodiments, the verifying unit 204 is configured to verify the certificate of the new node, and verify whether a node identity certification authority corresponding to the certificate of the new node is a node identity certification authority approved by the blockchain.

In some embodiments, the target transaction further includes digital signatures created by endorsement nodes of the blockchain based on at least the certificate of the new node; the verifying unit 204 is configured to verify whether valid digital signatures created by the endorsement nodes of the blockchain based on at least the certificate of the new node meet a predetermined quantity.

In some embodiments, the apparatus 20 further includes the following: a smart contract execution unit 208, configured to invoke a smart contract corresponding to management of the node identity table, execute update logic of the node identity table stated in the smart contract, verify the target transaction, and after the verification is passed, correspondingly record the unique identifier and the certificate of the new node to the node identity table.

In some embodiments, the apparatus 20 further includes an obtaining unit 210 and a storage unit 212, where the receiving unit 202 is configured to receive a network address of the new node, the unique identifier of the new node, and a digital signature created by the new node; the obtaining unit 210 is configured to obtain the node identity table from the distributed database of the blockchain, and obtain the certificate of the new node based on the unique identifier; the verifying unit 204 is configured to verify the digital signature based on the certificate of the new node; the storage unit 212 is configured to store the network address in a local database of the existing node of the blockchain after the verification is passed.

In some embodiments, the apparatus 20 further includes the following: a sending unit 214, configured to send network addresses of other existing nodes of the blockchain stored in a local database of the blockchain node to the new node.

In some embodiments, the apparatus 20 further includes the following: a sending unit 214, configured to send data in the distributed database of the blockchain backed up by the existing node of the blockchain to the new node.

For detailed implementation processes of functions and roles of the units or modules in the previously described apparatus, references can be made to the implementation processes of corresponding steps in the previously described method. For related parts, references can be made to descriptions in the method embodiments. Details are omitted here for simplicity.

The described apparatus embodiments are merely examples. The units described as separate parts can or do not have to be physically separate, and parts displayed as units can or do not have to be physical modules, can be located in one position, or can be distributed on a plurality of network modules. Some or all of the units or modules can be selected based on actual needs to achieve the objectives of the solutions in the present specification. A person of ordinary skill in the art can understand and implement the embodiments of the present specification without creative efforts.

The apparatus, unit, or module described in the previously described embodiments can be implemented by a computer chip or an entity, or implemented by a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Corresponding to the previously described method embodiments, embodiments of the present specification further provide a computer device, and the computer device includes a memory and a processor. The memory stores a computer program that can be executed by the processor. When executing the stored computer program, the processor performs steps of the blockchain-based node management method in some embodiments of the present specification. For detailed descriptions of the steps of the blockchain-based node management method, references can be made to the previous content, and no repetition is needed.

Corresponding to the previously described method embodiments, embodiments of the present specification further provide a computer readable storage medium, and the storage medium stores a computer program. When the computer program is executed by a processor, steps of the blockchain-based node management method in some embodiments of the present specification are performed. For detailed descriptions of the steps of the blockchain-based node management method, references can be made to the previous content, and no repetition is needed.

The previous descriptions are merely example embodiments of the present specification, but are not intended to limit the present specification. Any modification, equivalent replacement, or improvement made without departing from the spirit and principle of the present specification shall fall within the protection scope of the present specification.

In typical configuration, the computing device includes one or more processors (CPU), an input/output interface, a network interface, and a memory.

The memory can include a form of a volatile memory, a random access memory (RAM) and/or a nonvolatile memory, etc. in a computer readable medium, such as a read-only memory (ROM) or a flash memory (flash RAM). The memory is an example of the computer readable medium.

The computer readable medium includes permanent and non-permanent, removable and non-removable media, and can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by the computing device. Based on the definition in the present specification, the computer readable medium does not include a transitory computer readable medium (transitory media), for example, a modulated data signal and carrier.

It is worthwhile to further note that, the terms "include", "contain", or their any other variants are intended to cover a non-exclusive inclusion, so that a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that the embodiments of the present specification can be provided as a method, a system, or a computer program product. Therefore, the embodiments of the present specification can use a form of hardware only embodiments, software only embodiments, or embodiments with a combination of software and hardware. In addition, the embodiments of the present specification can use a form of a computer program product that is implemented on one or more computer-usable storage media (including but not limited to a disk memory, a CD-ROM, an optical memory, etc.) that include computer-usable program code.

What is claimed is:

1. A computer-implemented method, comprising:

receiving, via an out-of-blockchain communication by an existing node of a blockchain having node identity table management permission in the blockchain for accessing a node identity table stored in a distributed database of the blockchain, a target transaction, wherein the target transaction comprises a certificate of a new node, a unique identifier of the new node, and digital signatures created by one or more endorsement nodes of the blockchain that endorse joining of the new node to the blockchain, and wherein the certificate of the new node includes a public key corresponding to the new node and a digital signature created by a node identity certification authority for the public key of the new node;

verifying, by the existing node of the blockchain, the target transaction when (i) the node identity certification authority is a verified node identity certification authority approved by the blockchain and (ii) a quantity of the one or more endorsement nodes that endorse joining of the new node to the blockchain meet a predetermined quantity;

after verifying the target transaction, recording, in the node identity table that is used to record a certificate of a blockchain node and a unique identifier that is of the blockchain node and that corresponds to the certificate, the unique identifier, and the certificate of the new node;

after receiving permission for the new node to loin the blockchain, obtaining, by the new node, a network address of at least one existing node of the blockchain by an out-of-chain communication;
establishing, by the new node, communication connection with the at least one existing node using the network address; and
performing the target transaction that includes data to change a user's account balance.

2. The computer-implemented method of claim 1, further comprising:
invoking a smart contract corresponding to management of the node identity table;
executing update logic of the node identity table stated in the smart contract;
verifying the target transaction; and
after verifying the target transaction, correspondingly recording the unique identifier and the certificate of the new node in the node identity table.

3. The computer-implemented method of claim 1, further comprising:
receiving a network address of the new node, the unique identifier of the new node, and a digital signature created by the new node;
obtaining the node identity table from the distributed database of the blockchain, and obtaining the certificate of the new node based on the unique identifier;
verifying the digital signature based on the certificate of the new node; and
storing the network address in a local database of the existing node of the blockchain in response to verifying the digital signature.

4. The computer-implemented method of claim 3, further comprising:
sending network addresses of other existing nodes of the blockchain stored in a local database of the blockchain node to the new node.

5. The computer-implemented method of claim 3, further comprising the following:
sending data in the distributed database of the blockchain backed up by the existing node of the blockchain to the new node.

6. A computer-implemented system, comprising:
one or more computers; and
one or more non-transitory computer memory devices interoperably coupled with the one or more computers and having tangible, non-transitory, machine-readable media storing instructions that, when executed by the one or more computers, cause the one or more computers to perform operations comprising:
receiving, via an out-of-blockchain communication by an existing node of a blockchain having node identity table management permission in the blockchain for accessing a node identity table stored in a distributed database of the blockchain, a target transaction, wherein the target transaction comprises a certificate of a new node, a unique identifier of the new node, and digital signatures created by one or more endorsement nodes of the blockchain that endorse joining of the new node to the blockchain, and wherein the certificate of the new node includes a public key corresponding to the new node and a digital signature created by a node identity certification authority for the public key of the new node;
verifying, by the existing node of the blockchain, the target transaction when (i) the node identity certification authority is a verified node identity certification authority approved by the blockchain and (ii) a quantity of the one or more endorsement nodes that endorse joining of the new node to the blockchain meet a predetermined quantity;
after verifying the target transaction, recording, in the node identity table that is used to record a certificate of a blockchain node and a unique identifier that is of the blockchain node and that corresponds to the certificate, the unique identifier and the certificate of the new node;
after receiving permission for the new node to loin the blockchain, obtaining, by the new node, a network address of at least one existing node of the blockchain by an out-of-chain communication;
establishing, by the new node, communication connection with the at least one existing node using the network address; and
performing the target transaction that includes data to change a user's account balance.

7. The computer-implemented system of claim 6, the operations further comprising:
invoking a smart contract corresponding to management of the node identity table;
executing update logic of the node identity table stated in the smart contract;
verifying the target transaction; and
after verifying the target transaction, correspondingly recording the unique identifier and the certificate of the new node in the node identity table.

8. The computer-implemented system of claim 6, the operations further comprising:
receiving a network address of the new node, the unique identifier of the new node, and a digital signature created by the new node;
obtaining the node identity table from the distributed database of the blockchain, and obtaining the certificate of the new node based on the unique identifier;
verifying the digital signature based on the certificate of the new node; and
storing the network address in a local database of the existing node of the blockchain in response to verifying the digital signature.

9. The computer-implemented system of claim 8, the operations further comprising:
sending network addresses of other existing nodes of the blockchain stored in a local database of the blockchain node to the new node.

10. A non-transitory computer memory device having tangible, non-transitory, machine-readable media storing instructions that, when executed by one or more computers, cause the one or more computers to perform operations comprising:
receiving, via an out-of-blockchain communication by an existing node of a blockchain having node identity table management permission in the blockchain for accessing a node identity table stored in a distributed database of the blockchain, a target transaction, wherein the target transaction comprises a certificate of a new node, a unique identifier of the new node, and digital signatures created by one or more endorsement nodes of the blockchain that endorse joining of the new node to the blockchain, and wherein the certificate of the new node includes a public key corresponding to the new node and a digital signature created by a node identity certification authority for the public key of the new node;
verifying, by the existing node of the blockchain, the target transaction when (i) the node identity certification authority is a verified node identity certification authority approved by the blockchain and (ii) a quantity of the one or more endorsement nodes that endorse joining of the new node to the blockchain meet a predetermined quantity;

after verifying the target transaction, recording, in the node identity table that is used to record a certificate of a blockchain node and a unique identifier that is of the blockchain node and that corresponds to the certificate, the unique identifier and the certificate of the new node;

after receiving permission for the new node to join the blockchain, obtaining, by the new node, a network address of at least one existing node of the blockchain by an out-of-chain communication;

establishing, by the new node, communication connection with the at least one existing node using the network address; and performing the target transaction that includes data to change a user's account balance.

11. The non-transitory computer memory device of claim 10, the operations further comprising:

invoking a smart contract corresponding to management of the node identity table;

executing update logic of the node identity table stated in the smart contract;

verifying the target transaction; and after verifying the target transaction, correspondingly recording the unique identifier and the certificate of the new node in the node identity table.

12. The non-transitory computer memory device of claim 10, the operations further comprising:

receiving a network address of the new node, the unique identifier of the new node, and a digital signature created by the new node;

obtaining the node identity table from the distributed database of the blockchain, and obtaining the certificate of the new node based on the unique identifier;

verifying the digital signature based on the certificate of the new node; and storing the network address in a local database of the existing node of the blockchain in response to verifying the digital signature.

13. The non-transitory computer memory device of claim 12, the operations further comprising:

sending network addresses of other existing nodes of the blockchain stored in a local database of the blockchain node to the new node.

\* \* \* \* \*

UNITED STATES PATENT AND TRADEMARK OFFICE
CERTIFICATE OF CORRECTION

| | | |
|---|---|---|
| PATENT NO. | : 11,461,773 B2 | Page 1 of 1 |
| APPLICATION NO. | : 17/162850 | |
| DATED | : October 4, 2022 | |
| INVENTOR(S) | : Dong Pan | |

It is certified that error appears in the above-identified patent and that said Letters Patent is hereby corrected as shown below:

In the Claims

Column 12, Line 66, in Claim 1, delete "loin" and insert -- join --.

Column 14, Line 8, in Claim 6, delete "loin" and insert -- join --.

Signed and Sealed this
Twentieth Day of December, 2022

*Katherine Kelly Vidal*

Katherine Kelly Vidal
*Director of the United States Patent and Trademark Office*